United States Patent
Brostmeyer et al.

(10) Patent No.: US 11,187,622 B2
(45) Date of Patent: Nov. 30, 2021

(54) APPARATUS AND PROCESS FOR TESTING A LARGE COMBUSTOR USING A CAES FACILITY

(71) Applicant: Florida Turbine Technologies, Inc., Jupiter, FL (US)

(72) Inventors: Joseph D. Brostmeyer, Jupiter, FL (US); Scott A. Baker, Jupiter, FL (US)

(73) Assignee: Florida Turbine Technologies, Inc., Jupiter, FL (US)

( * ) Notice: Subject to any disclaimer, the term of this patent is extended or adjusted under 35 U.S.C. 154(b) by 0 days.

(21) Appl. No.: 16/491,850

(22) PCT Filed: Sep. 18, 2017

(86) PCT No.: PCT/US2017/052055
§ 371 (c)(1),
(2) Date: Sep. 6, 2019

(87) PCT Pub. No.: WO2018/164713
PCT Pub. Date: Sep. 13, 2018

(65) Prior Publication Data
US 2021/0140850 A1 May 13, 2021

Related U.S. Application Data

(60) Provisional application No. 62/468,397, filed on Mar. 8, 2017.

(51) Int. Cl.
*G01M 15/14* (2006.01)
*F02C 6/16* (2006.01)

(52) U.S. Cl.
CPC ............. *G01M 15/14* (2013.01); *F02C 6/16* (2013.01); *F05D 2220/32* (2013.01); *F05D 2260/83* (2013.01)

(58) Field of Classification Search
CPC ...... G01M 15/14; F02C 6/16; F05D 2220/32; F05D 2260/83
See application file for complete search history.

(56) References Cited

U.S. PATENT DOCUMENTS 7,574,904 B1 * 8/2009 Davies ............... G01M 99/002
73/112.01
9,109,614 B1 * 8/2015 Fong ..................... F15B 21/14
(Continued)

OTHER PUBLICATIONS

International Search Report and Written Opinion dated Jan. 22, 2018 for corresponding International Application No. PCT/US2017/052055, filed on Sep. 18, 2017; consisting of 19-pages.

*Primary Examiner* — Eric S. McCall
(74) *Attorney, Agent, or Firm* — Christopher & Weisberg, P.A.

(57) ABSTRACT

An apparatus, system, and process for testing a gas turbine engine or other test object under a cold condition, such as a compressor of a gas turbine engine, a combustor of a gas turbine engine, or an afterburner of an aero gas turbine engine, using compressed air stored in an underground storage reservoir of a CAES system along with an air turbine or an air injector. High-pressure, but low-volume, compressed air from a CAES system can be converted into a low-pressure, but high-volume, flow of compressed air using an air injector to supply enough compressed air to test a combustor or an afterburner. High pressure compressed air from the CAES system can be used to drive an air turbine that then drives a compressor for testing.

6 Claims, 5 Drawing Sheets

(56) References Cited

U.S. PATENT DOCUMENTS

| | | | |
|---|---|---|---|
| 9,200,983 B2* | 12/2015 | Brostmeyer | G01M 15/14 |
| 2003/0131599 A1* | 7/2003 | Gerdes | F02C 6/16 |
| | | | 60/727 |
| 2004/0216535 A1* | 11/2004 | Brostmeyer | G01N 3/18 |
| | | | 73/865.6 |
| 2011/0094236 A1* | 4/2011 | Finkenralh | H02J 15/006 |
| | | | 60/772 |
| 2014/0053641 A1 | 2/2014 | Brostmeyer | |
| 2015/0000248 A1* | 1/2015 | del Omo | F01K 23/10 |
| | | | 60/39.182 |
| 2015/0167489 A1* | 6/2015 | Heiligenstein | F01D 15/10 |
| | | | 290/52 |
| 2016/0053682 A1* | 2/2016 | Page | F01K 21/047 |
| | | | 60/775 |
| 2016/0069264 A1* | 3/2016 | Brostmeyer | F02C 3/107 |
| | | | 60/39.182 |
| 2016/0069777 A1 | 3/2016 | Brostmeyer et al. | |
| 2017/0254265 A1* | 9/2017 | Lemieux | F02C 6/06 |
| 2019/0041293 A1* | 2/2019 | Brostmeyer | G01M 15/14 |

* cited by examiner

APPARATUS AND PROCESS FOR TESTING A LARGE COMBUSTOR USING A CAES FACILITY

CROSS-REFERENCE TO RELATED APPLICATIONS

This application is a Submission under 35 U.S.C. § 371 for U.S. National Stage Patent Application of International Application Number PCT/US2017/052055, filed Sep. 18, 2017, entitled APPARATUS AND PROCESS FOR TESTING A LARGE COMBUSTOR USING A CAES FACILITY, which claims priority to U.S. Provisional Application No. 62/468,397, filed Mar. 18, 2017, entitled APPARATUS AND PROCESS FOR TESTING A LARGE COMBUSTOR USING A CAES FACILITY, the entirety of all of which are incorporated herein by reference.

GOVERNMENT LICENSE RIGHTS

None.

TECHNICAL FIELD

The present invention relates generally to a compressed air energy storage (CAES) facility, and more specifically an apparatus, a system, and a process for testing a large combustor using the CAES facility.

BACKGROUND

A compressed air energy storage (CAES) facility is a power plant which uses a large underground reservoir to store a large amount of compressed air. There are only two known CAES facilities in the world with one in Macintosh, Ala. and the second in Hundorf, Germany. These CAES facilities have an industrial gas turbine engine that drives an electric generator to produce electrical power. During no-peak loads (e.g., at night), the engine is operated to drive a compressor and fill the underground reservoir with compressed air. During peak loads (e.g., day time), the stored compressed air is delivered into the industrial gas turbine (IGT) engine. This improves the efficiency of the power plant and allows for the engine to operate at full load at night when the electrical power demand is very low.

The applicant of the present invention is also the owner of U.S. Pat. No. 9,200,983 issued to Brostmeyer on Dec. 1, 2015, and entitled APPARATUS AND PROCESS FOR TESTING AN INDUSTRIAL GAS TURBINE ENGINE AND COMPONENTS THEREOF, the entire disclosure of which is incorporated herein by reference. This Brostmeyer patent discloses the use of one of these CAES facilities for the use of testing a gas turbine engine or a component of an engine or an aero vehicle using compressed air stored in the underground reservoir. This allows for a large amount of compressed air to be delivered to a testing facility.

One major problem with a pre-existing CAES facility like the one in Hundorf, Germany is that the pipes that deliver the compressed air from the reservoir to the test area are too small to deliver the amount of air flow required to test a large combustor such as used in a large frame heavy duty industrial gas turbine engine. The reservoir can hold a high pressure of compressed air, but cannot deliver the amount of air flow required to test the large combustor.

In the prior art, when a full gas turbine engine is tested, the engine is operated under hot conditions in that fuel is burned in the combustor to produce a hot gas stream/flow that is passed through the turbine that drives the compressor of the engine. The engine will drive an electric generator or a water break to dissipate the load produced when the engine is operating. Testing an engine under hot conditions produces a number of negative issues.

SUMMARY

An apparatus and a process for testing a large combustor or high Mach number aero vehicle using an underground compressed air storage reservoir such as a CAES in which the supply pipes used to deliver the compressed air to the test section are not large enough to supply the large volume of compressed air. An air injector is used to convert high pressure and low volume compressed air from the underground reservoir into lower pressure but high volume compressed air by using the high pressure low volume compressed air to draw in ambient air from atmosphere to produce the large volume but lower pressure air for testing of the component. A heater or heat exchanger is used to heat up the compressed air to a certain temperature for use in the testing of a combustor that will simulate real conditions (e.g., standard operating conditions for the high Mach number aero vehicle and/or component thereof).

In another embodiment of the present invention, a fuel is burned in the compressed air to produce a high temperature gas that is used to drive a turbine, where the turbine drives a compressor for testing of the compressor. The compressed air from the compressor is used to pass through a heat exchanger and add heat to the compressed air passing into the turbine.

In another embodiment, compressed air from the underground reservoir is used to drive an air turbine that then drives a compressor to supply compressed air at a normal pressure to a combustor for testing of the combustor.

In one embodiment, a process for testing a gas turbine engine under a cold condition using a CAES system includes: storing a compressed air in an underground storage reservoir of the CAES system; passing the compressed air from underground storage reservoir into an air turbine; and driving the gas turbine engine using the air turbine without combustion in a combustor of the gas turbine engine. In one aspect of the embodiment, the process further includes preheating the compressed air from the underground storage reservoir prior to passing the compressed air from the underground storage reservoir into the air turbine.

In one embodiment, a process for testing a compressor using a CAES system includes: storing a compressed air in an underground storage reservoir of the CAES system; passing the compressed air from the underground storage reservoir into a combustor to burn with a fuel and produce a hot gas flow; and passing the hot gas flow through a turbine to drive the compressor to be tested.

In one aspect of the embodiment, the process further includes: passing the hot gas flow from the combustor through a heat exchanger prior to passing the hot gas flow through the turbine; and passing the compressed air from the compressor through the heat exchanger such that heat from the compressed air flow increases a temperature of the hot gas flow from the combustor prior to entry of the hot gas flow into the turbine.

In one aspect of the embodiment, the process further includes: passing the compressed air from the underground storage reservoir through a pre-heater prior to passing the compressed air from the underground storage reservoir into the combustor.

In one embodiment, a process for testing a combustor using a CAES system includes: storing a high pressure compressed air in an underground storage reservoir of the CAES system; passing high-pressure but low-volume compressed air from the underground storage reservoir into an air injector to produce low-pressure but high-volume compressed air; passing the low-pressure but high-volume compressed air from the air injector into the combustor; and burning a fuel with the low-pressure but high-volume compressed air in the combustor for testing of the combustor.

In one embodiment, a process for testing a combustor using a CAES system includes: storing a high pressure compressed air in an underground storage reservoir of the CAES system; passing the high pressure compressed air from the underground storage reservoir into an air turbine; driving a low-pressure but high-volume compressor with the air turbine to produce a low-pressure but high-volume compressed air; passing the low-pressure but high-volume compressed air from the low-pressure but high-volume compressor into the combustor; and burning a fuel with the low-pressure but high-volume compressed air in the combustor for testing of the combustor.

In one embodiment, a process for testing an afterburner of an aero gas turbine engine under conditions of high altitude includes: storing a high pressure compressed air in an underground storage reservoir of a CAES system; passing high-pressure compressed air from the underground storage reservoir through an air injector to produce a low-pressure compressed air; operating the aero gas turbine engine to produce a hot gas flow; passing the hot gas flow through the afterburner; and passing the low-pressure compressed air from the air injector at an outlet of the afterburner for testing the afterburner to simulate a high-altitude condition.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein.

DETAILED DESCRIPTION OF THE INVENTION

The present invention is an apparatus, system, and a process for using an underground compressed air storage reservoir, such as one found at a CAES facility, to supply enough compressed air for testing a large combustor of a gas turbine engine or an afterburner of an aero gas turbine engine at high altitude conditions. U.S. Pat. No. 9,200,983 issued to Brostmeyer on Dec. 1, 2015, and entitled APPARATUS AND PROCESS FOR TESTING AN INDUSTRIAL GAS TURBINE ENGINE AND COMPONENTS THEREOF, discloses the use of a CAES facility such as the one in Hundorf, Germany to supply a large volume of compressed air from an underground storage reservoir for testing of a combustor. However, the applicant has discovered that the pipes used in the Hundorf, Germany CAES facility are too small to supply the volume of compressed air for testing of a large combustor such as that used in a large frame heavy duty industrial gas turbine engine. The present disclosure also includes a system, apparatus, and a process for testing a gas turbine engine under cold condition without having to burn a fuel in the combustor.

Figure 1:
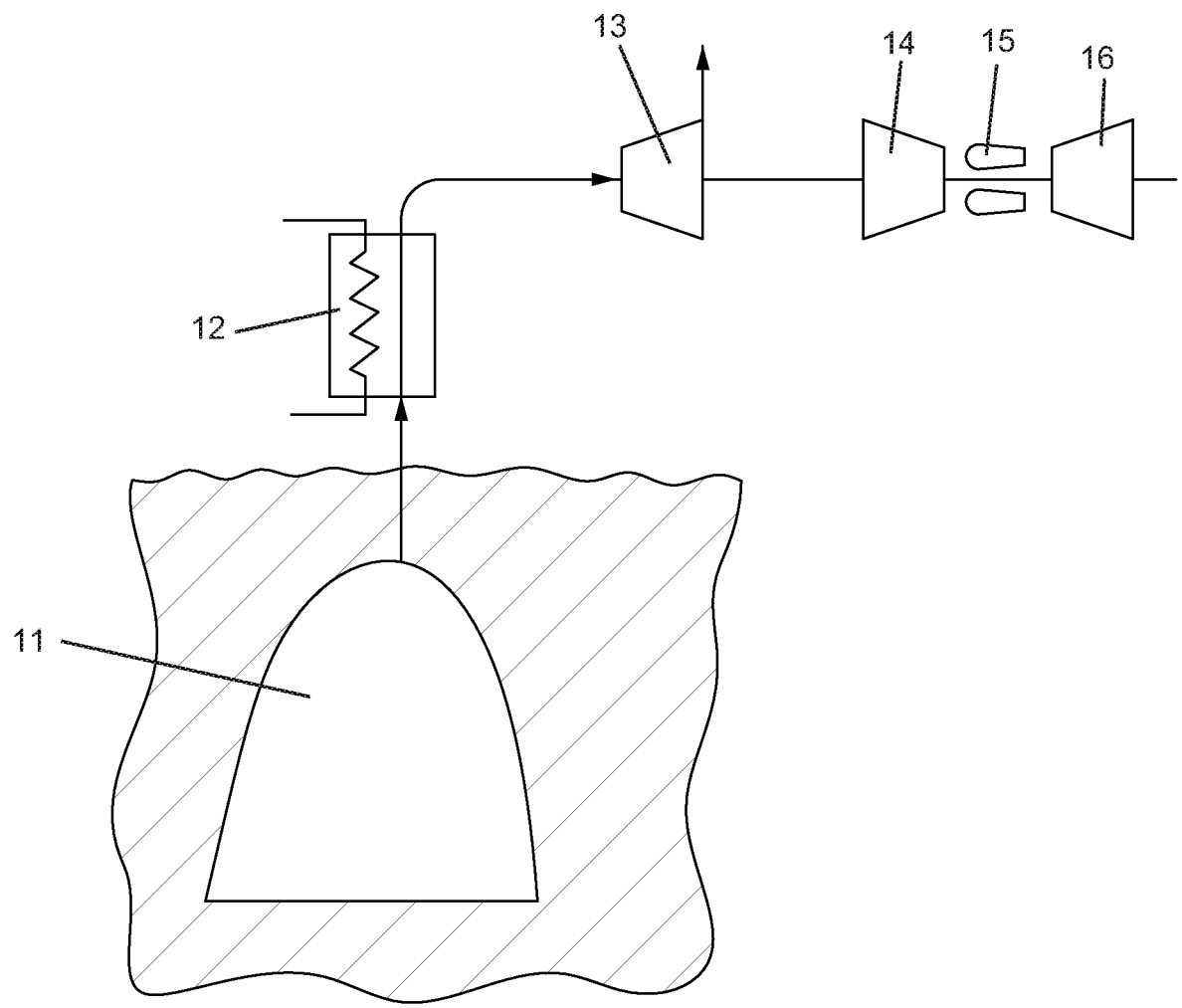
FIG. 1 shows a system for testing a gas turbine engine that is driven by an air turbine according with compressed air from an underground reservoir according to the present disclosure.

FIG. 1 shows a system for using an underground storage reservoir 11, such as that of a CAES system/facility, to supply compressed air to an air turbine 13 that then drives a gas turbine engine (which includes a compressor 14, a combustor 15, and a turbine 16) for testing in a cold condition. By cold condition, this disclosure means that no fuel is burned in the combustor 15 and thus no hot gas stream/flow is passed through the turbine 16. The engine is driven solely by the air turbine 13. A pre-heater 12 can be used to increase a temperature of the compressed air from the underground storage reservoir 11 prior to introduction of the compressed air into the air turbine 13. The air turbine 13 drives the compressor 14 of the gas turbine engine that then drives the turbine 16 through a common rotor.

With the system of FIG. 1, an aero or an industrial gas turbine engine can be tested under cold conditions so that issues that arise under hot condition testing does not occur, and no load is required on the engine, such as an electric generator or a water break.

Figure 2:
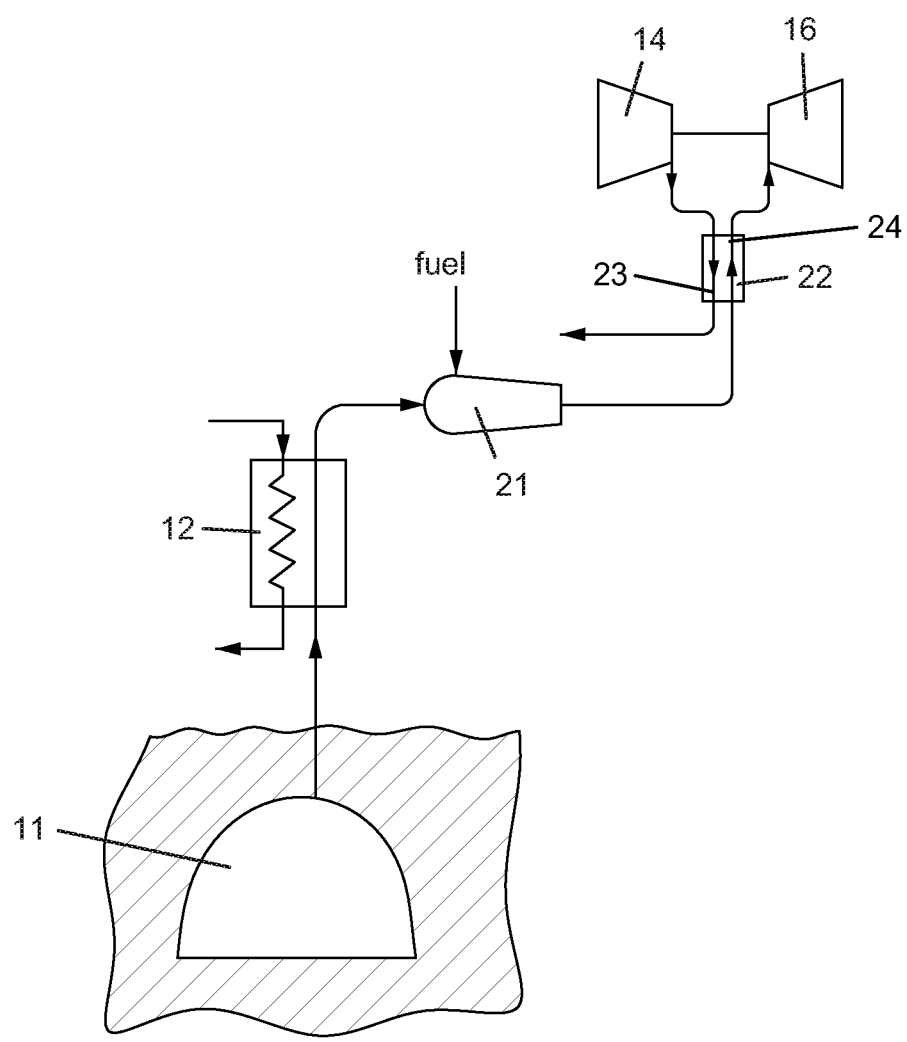
FIG. 2 shows a system for testing a compressor using an air turbine with compressed air from an underground reservoir according to the present disclosure.
Figure 3:
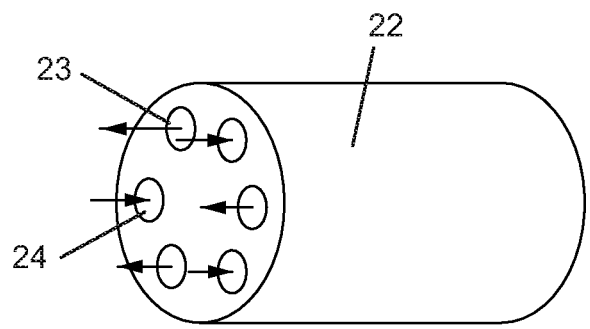
FIG. 3 shows a heat exchanger used in the system of FIG. 2.

FIG. 2 shows a system for testing a compressor 14 of a gas turbine engine using compressed air from an underground storage reservoir 11 to drive the turbine 16 of the gas turbine engine as an air turbine. A combustor of the gas turbine engine is replaced with a heat exchanger 22 and a combustor 21 is used to burn a fuel with the compressed air from the underground storage reservoir 11 to produce a heated compressed air flow (also referred to herein as a hot gas flow) to the turbine 16. Pre-heated compressed air from the underground storage reservoir 11 is passed through at least one passage 24 in the heat exchanger 22 and into the turbine 16 acting as an air turbine to drive the compressor 14 through the rotor of the gas turbine engine. Compressed air from the compressor 14 is passed through at least one passage 23 in the heat exchanger 22 that flows in an opposite direction from the pre-heated compressed air to transfer heat from the compressed air to the pre-heated compressed air from the underground storage reservoir 11. Put another way, the at least one passage 24 and at least one passage 23 have a counter-flow configuration within the heat exchanger 22, and compressed air from the compressor 14 within the at least one passage 23 transfers heat to the pre-heated compressed air from the underground storage reservoir 11 within the at least one passage 24. The heat exchanger 22 is shown in greater detail in FIG. 3. A pre-heater 12 can also be used to pre-heat compressed air from the underground storage reservoir 11 prior to passage into the combustor 21.

Figure 4:
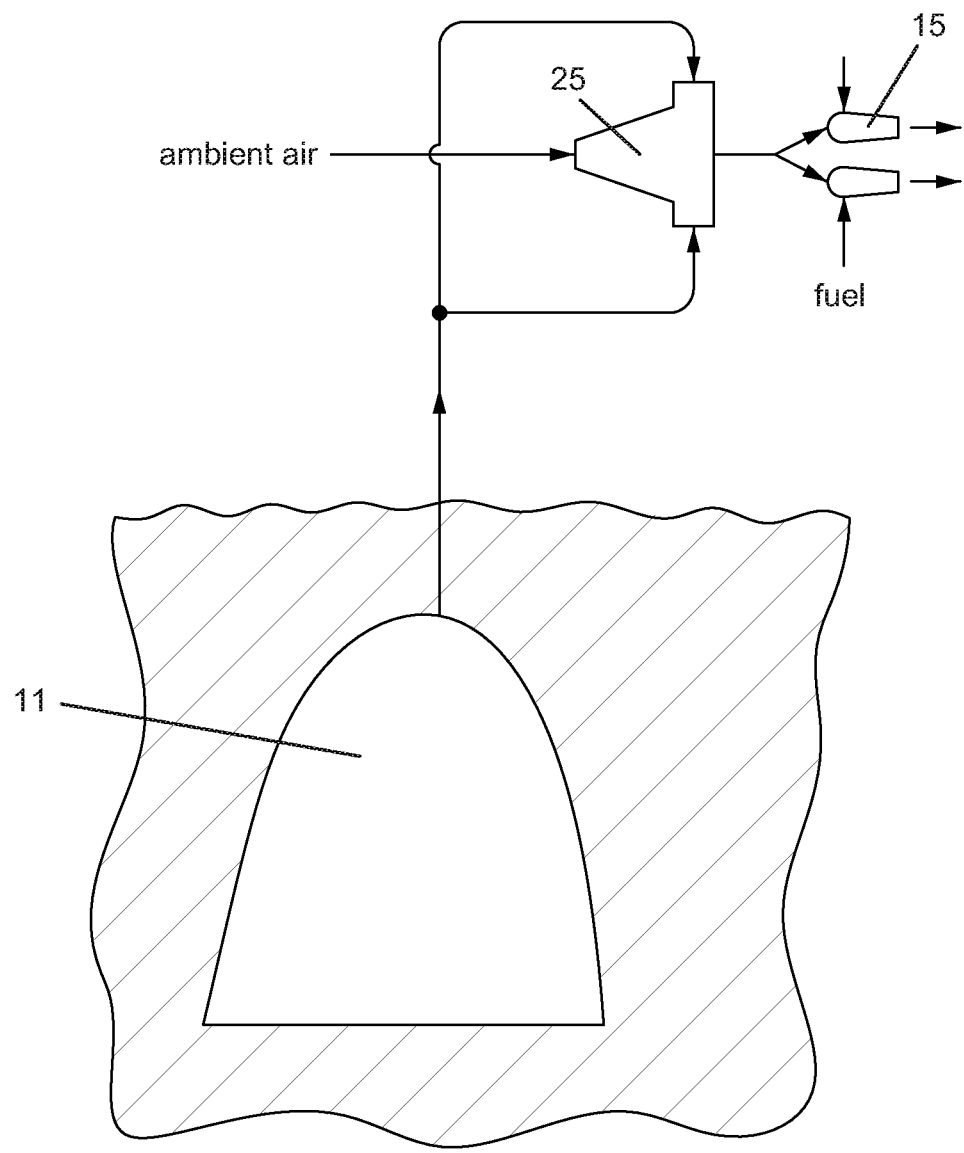
FIG. 4 shows a system for testing a large combustor using an air jet with compressed air from an underground reservoir according to the present disclosure.

FIG. 4 shows a system for testing a combustor 15 or any apparatus that requires more volume flow than that which the underground storage reservoir 11 is capable of supplying (which, for simplicity, may be referred to herein as the test object). The high-pressure, but low-volume, compressed air from the underground storage reservoir 11 is passed through an air injector 25, which uses the high-pressure, but low-volume, compressed air to suck in ambient air from atmosphere to produce a large volume of lower-pressure compressed air for use in testing the combustor 15 or other apparatus (the test object). The air injector 25 supplies compressed air to the combustor 15 with fuel burned for testing the combustor 15.

Using the air injector 25 to produce a large volume of lower-pressure air using a smaller volume of higher-pressure air from the underground storage reservoir 11 will allow for an increase in the efficiency of the testing system/facility. If the underground storage reservoir 11 did have large pipes capable of supplying the volume of compressed air for testing, then the energy used to compress the air stored in the reservoir would mostly be lost when the high-pressure air is converted to lower-pressure air needed for testing. With the use of the air injector 25, the high-pressure air is used to create a larger volume of flow with lower-pressure by using the energy of the higher-pressure air to draw into the compressed air flow the ambient air from the atmosphere. The high-pressure air is thus mixed with the ambient air flow to produce the large volume of lower-pressure air with less loss of energy input to the compressed air.

Figure 5:
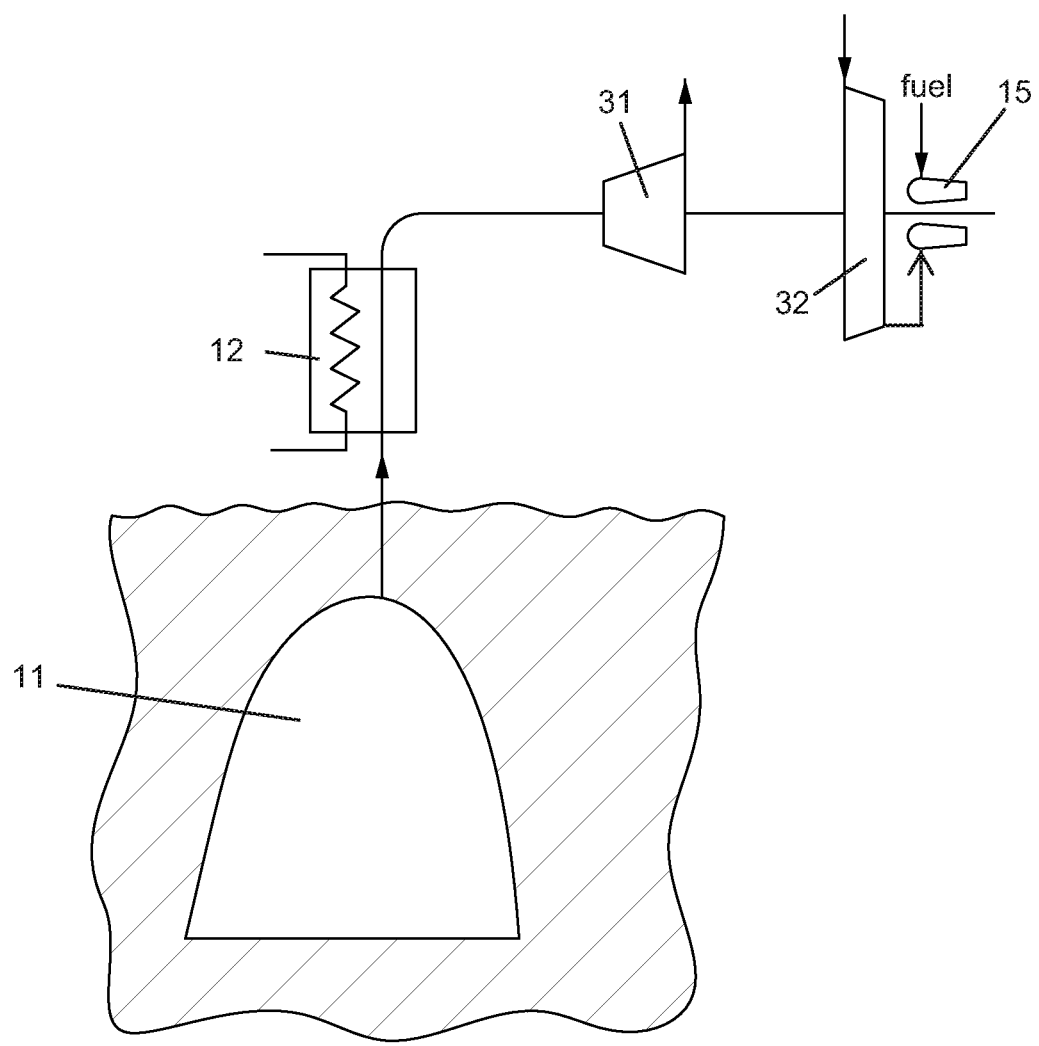
FIG. 5 shows a system for testing a large combustor using an air turbine and a large compressor with compressed air from an underground reservoir.

FIG. 5 shows another system for testing a combustor 15 (such as a large combustor 15) using compressed air from an underground storage reservoir 11 that cannot supply the large volume of compressed air to the combustor 15. Compressed air from the underground storage reservoir 11 is supplied to an air turbine 31 that then drives a large compressor 32 (which may also be referred to herein as a low-pressure, but high-volume compressor 32) that can supply the large volume of compressed air to the combustor 15. A pre-heater 12 can be used to preheat the compressed air from the underground storage reservoir 11 prior to introduction into the air turbine 31.

Figure 6:
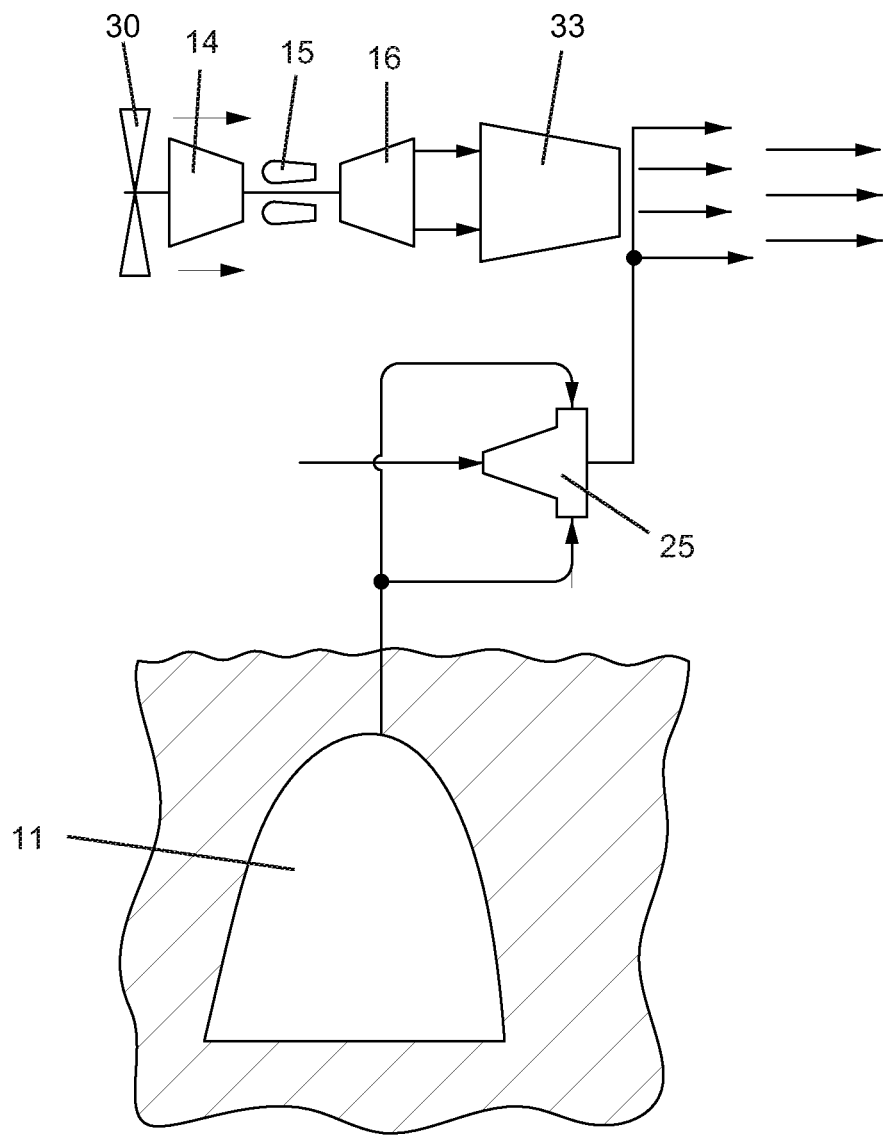
FIG. 6 shows a system for testing an afterburner of an aero gas turbine engine under low pressure conditions such as high altitude using compressed air from an underground reservoir.

FIG. 6 shows a system for testing an afterburner 33 of an aero gas turbine engine under conditions that simulate high altitudes or low atmospheric pressure. The aero gas turbine engine includes a compressor 14 connected to a turbine 16 through a rotor that also drives a fan 30, and a combustor 15. The compressor 14, combustor 15, and turbine 16 are collectively the aero gas turbine engine. The afterburner 33 is located downstream from the turbine 16. The underground storage reservoir 11 supplies high-pressure, but low-volume, compressed air to an air injector 25. The air injector 25 then supplies low-pressure compressed air to or at an outlet of the afterburner 33 for testing the afterburner 33 at a simulated high-altitude condition.

In one embodiment, a process for testing a gas turbine engine under a cold condition using a CAES system includes: storing a compressed air in an underground storage reservoir 11 of the CAES system; passing the compressed air from underground storage reservoir 11 into an air turbine 13; and driving the gas turbine engine using the air turbine 13 without combustion in a combustor 15 of the gas turbine engine 14, 15, 16. In one aspect of the embodiment, the process further includes preheating the compressed air from the underground storage reservoir 11 prior to passing the compressed air from the underground storage reservoir 11 into the air turbine 13.

In one embodiment, a process for testing a compressor using a CAES system includes: storing a compressed air in an underground storage reservoir 11 of the CAES system; passing the compressed air from the underground storage reservoir 11 into a combustor 21 to burn with a fuel and produce a hot gas flow; and passing the hot gas flow through a turbine 16 to drive the compressor 14 to be tested.

In one aspect of the embodiment, the process further includes: passing the hot gas flow from the combustor 21 through a heat exchanger 22 prior to passing the hot gas flow through the turbine 16; and passing the compressed air from the compressor 14 through the heat exchanger 22 such that heat from the compressed air flow increases a temperature of the hot gas flow from the combustor 21 prior to entry of the hot gas flow into the turbine 16.

In one aspect of the embodiment, the process further includes: passing the compressed air from the underground storage reservoir 11 through a pre-heater 12 prior to passing the compressed air from the underground storage reservoir 11 into the combustor 21.

In one embodiment, a process for testing a combustor 15 using a CAES system includes: storing a high pressure compressed air in an underground storage reservoir 11 of the CAES system; passing high-pressure but low-volume compressed air from the underground storage reservoir 11 into an air injector 25 to produce low-pressure but high-volume compressed air; passing the low-pressure but high-volume compressed air from the air injector 25 into the combustor 15; and burning a fuel with the low-pressure but high-volume compressed air in the combustor 15 for testing of the combustor 15.

In one embodiment, a process for testing a combustor 15 using a CAES system includes: storing a high pressure compressed air in an underground storage reservoir 11 of the CAES system; passing the high pressure compressed air from the underground storage reservoir 11 into an air turbine 31; driving a low-pressure but high-volume compressor 32 with the air turbine 31 to produce a low-pressure but high-volume compressed air; passing the low-pressure but high-volume compressed air from the low-pressure but high-volume compressor 32 into the combustor 15; and burning a fuel with the low-pressure but high-volume compressed air in the combustor 15 for testing of the combustor 15.

In one embodiment, a process for testing an afterburner 33 of an aero gas turbine engine 14, 15, 16 under conditions of high altitude includes: storing a high pressure compressed air in an underground storage reservoir 11 of a CAES system; passing high-pressure compressed air from the underground storage reservoir 11 through an air injector 25 to produce a low-pressure compressed air; operating the aero gas turbine engine 14, 15, 16 to produce a hot gas flow; passing the hot gas flow through the afterburner 33; and passing the low-pressure compressed air from the air injector 25 at an outlet of the afterburner 33 for testing the afterburner 33 to simulate a high-altitude condition.

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope and spirit of the invention, which is limited only by the following claims.

What is claimed is:

1. A process for testing a compressor using a compressed air energy storage (CAES) system, the process comprising:
   storing a compressed air in an underground storage reservoir of the CAES system;

passing the compressed air from the underground storage reservoir into a combustor to burn with a fuel and produce a hot gas flow; and passing the hot gas flow through a turbine to drive the compressor to be tested.

2. The process of claim 1, further comprising:

passing the hot gas flow from the combustor through a heat exchanger prior to passing the hot gas flow through the turbine; and passing the compressed air from the compressor through the heat exchanger such that heat from a flow of the compressed air increases a temperature of the hot gas flow from the combustor prior to entry of the hot gas flow into the turbine.

3. The process of claim 1, further comprising:

passing the compressed air from the underground storage reservoir through a pre-heater prior to passing the compressed air from the underground storage reservoir into the combustor.

4. A process for testing a combustor using a compressed air energy storage (CAES) system, the process comprising:

storing a high pressure compressed air in an underground storage reservoir of the CAES system;

passing high-pressure but low-volume compressed air from the underground storage reservoir into an air injector to produce low-pressure but high volume compressed air;

passing the low-pressure but high-volume compressed air from the air injector into the combustor; and burning a fuel with the low-pressure but high-volume compressed air in the combustor for testing of the combustor.

5. A process for testing a combustor using a compressed air energy storage (CAES) system, the process comprising:

storing a high pressure compressed air in an underground storage reservoir of the CAES system;

passing the high pressure compressed air from the underground storage reservoir into an air turbine;

driving a low-pressure but high-volume compressor with the air turbine to produce a low-pressure but high-volume compressed air;

passing the low-pressure but high-volume compressed air from the low pressure but high-volume compressor into the combustor; and burning a fuel with the low-pressure but high-volume compressed air in the combustor for testing of the combustor.

6. A process for testing an afterburner of an aero gas turbine engine under conditions of high altitude, the process comprising:

storing a high pressure compressed air in an underground storage reservoir of a compressed air energy storage (CAES) system; passing high-pressure compressed air from the underground storage reservoir through an air injector to produce a low-pressure compressed air;

operating the aero gas turbine engine to produce a hot gas flow;

passing the hot gas flow through the afterburner; and passing the low-pressure compressed air from the air injector at an outlet of the afterburner for testing the afterburner to simulate a high-altitude condition.

\* \* \* \* \*